(12) United States Patent
Danilak

(10) Patent No.: US 7,746,350 B1
(45) Date of Patent: Jun. 29, 2010

(54) CRYPTOGRAPHIC COMPUTATIONS ON GENERAL PURPOSE GRAPHICS PROCESSING UNITS

(75) Inventor: Radoslav Danilak, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 568 days.

(21) Appl. No.: 11/454,765

(22) Filed: Jun. 15, 2006

(51) Int. Cl.
*G06F 13/00* (2006.01)
*G06F 15/80* (2006.01)
*G06F 12/14* (2006.01)

(52) U.S. Cl. ................ 345/538; 345/505; 713/189; 713/190

(58) Field of Classification Search ............ 345/505, 345/537, 538; 380/28–30; 713/189–190
See application file for complete search history.

(56) References Cited

U.S. PATENT DOCUMENTS

| | | | |
|---|---|---|---|
| 6,789,147 B1 * | 9/2004 | Kessler et al. | 710/200 |
| 7,073,070 B2 * | 7/2006 | Girard | 713/190 |
| 7,203,310 B2 * | 4/2007 | England et al. | 380/200 |
| 7,421,076 B2 * | 9/2008 | Stein et al. | 380/42 |
| 2003/0053623 A1 * | 3/2003 | McCanny et al. | 380/37 |
| 2004/0039928 A1 * | 2/2004 | Elbe et al. | 713/189 |
| 2004/0184602 A1 * | 9/2004 | Nadehara | 380/28 |

* cited by examiner

*Primary Examiner*—Hau H Nguyen
(74) *Attorney, Agent, or Firm*—Patterson & Sheridan, LLP

(57) ABSTRACT

One embodiment of the invention sets forth a computing system for performing cryptographic computations. The computing system comprises a central processing unit, a graphics processing unit, and a driver. The central processing requests a cryptographic computation. In response, the driver downloads microcode to perform the cryptographic computation to the graphics processing unit and the graphics processing unit executes microcode. This offloads cryptographic computations from the CPU. As a result, cryptographic computations are performed faster and more efficiently on the GPU, freeing resources on the CPU for other tasks.

18 Claims, 11 Drawing Sheets

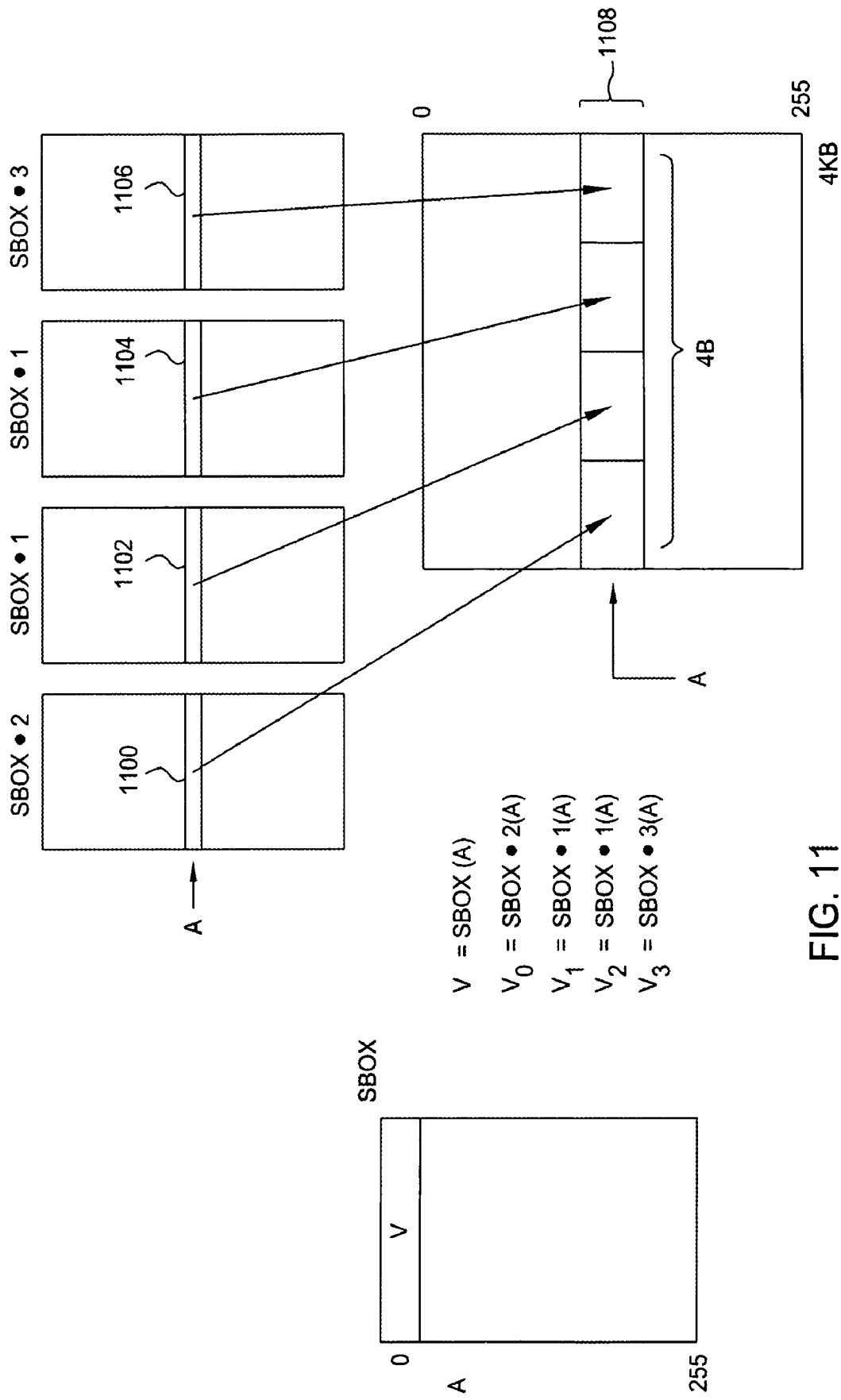

CRYPTOGRAPHIC COMPUTATIONS ON GENERAL PURPOSE GRAPHICS PROCESSING UNITS

BACKGROUND OF THE INVENTION

1. Field of the Invention

Embodiments of the present invention relate generally to cryptography and general-purpose computing on graphics processing units and more specifically to cryptographic computations on graphics processing units.

2. Description of the Related Art

Modern Graphics processing units (GPUs) use millions of transistors to perform calculations related to 3D computer graphics. GPUs were initially used to accelerate the memory-intensive work of texture mapping and rendering polygons, later adding units to accelerate geometric calculations such as translating vertices into different coordinate systems. Recent developments in GPUs include support for programmable shaders which can manipulate vertices and textures with many of the same operations supported by central processing units (CPUs), oversampling and interpolation techniques to reduce aliasing, and very high-precision color spaces. Because many of these computations involve matrix and vector operations, engineers and scientists have increasingly studied the use of GPUs for non-graphical calculations. The term general-purpose computing on graphics processing units (GPGPU) describes the recent development of using the GPU to offload certain computations from the CPU. Although modern GPUs allow some programmability in the form of 3D shaders (e.g., the C for graphics (CG) toolkit), this should not be confused with general software programmability.

Today's GPUs lack some fundamental computing constructs, such as integer data operands. The lack of integers and associated operations, such as bit-shifts and bitwise logical operations (e.g., AND, OR, XOR, NOT) makes GPUs ill suited for many mathematically complex tasks, such as cryptography. GPGPU computing presents additional challenges even for problems that map well to the GPU, because oftentimes GPU programming typically requires recasting the relevant computations into graphics terms. Thus, harnessing the power of a GPU for general-purpose computation often requires a concerted effort by experts in both computer graphics and in the particular scientific or engineering domain. For these reasons, it is not clear how to program particular computations for GPU processing or even how to select computations capable of efficient implementation on GPUs.

In addition, many personal computers (PCs) will soon include an operating system and/or hardware that provide Internet protocol (IP) security (IPsec) (described in RFCs 4301-4309), which is a standard for securing IP communications by encrypting IP packets at the network layer. IPsec may use multiple encryption methods to encapsulate payloads in the IP packets, such as Advanced Encryption Standard (AES) (described in FIPS PUB 197). The huge throughput required to perform cryptographic computations for AES will likely overwhelm most CPUs (e.g., bidirectional throughput of over 2 Gbits/s). These developments, along with the increased demand for computer security by businesses and individuals, will drive the need for offloading cryptographic computations from the CPU to the GPU to improve efficiency.

As the foregoing illustrates, what is needed in the art is a way to efficiently use a GPU to offload cryptographic computations from the CPU.

SUMMARY OF THE INVENTION

Embodiments of the invention set forth a system and method for performing cryptographic computation. The system includes a CPU, a GPU, and a driver. The CPU requests one or more cryptographic computations. In response, the driver downloads the microcode to perform the cryptographic computations to the GPU and the GPU executes the microcode. The GPU may perform integer and logical operations. The driver may divide the requests into batches, where the batch size is determined based on CPU speed, the number of streaming multiprocessors, and the number of threads executing per streaming multiprocessor. The cryptographic computation may encrypt one or more payloads using the AES algorithm. The GPU may have thread groups of 16 threads each where each thread group encrypts each of the 16 elements of a 4×4 input state simultaneously. There may be a precomputed table stored in memory that replaces S-box lookups, GF multiplications, and row and column mixing steps in the AES algorithm. Ten rounds of AES may be performed with fewer than 700 instructions or fewer than 800 clocks cycles.

One advantage of the disclosed system is that it provides a way to offload cryptographic computations from the CPU. As a result, cryptographic computations are performed faster and more efficiently on the GPU, freeing resources on the CPU for other tasks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 11 is a block diagram illustrating a further optimization of the lookup tables, according to one embodiment of the invention.

DETAILED DESCRIPTION

Among other things, the invention described herein offloads cryptographic computations from the CPU. As a result, the GPU performs cryptographic computations faster and more efficiently than the CPU, freeing resources on the CPU for other tasks.

Figure 1:
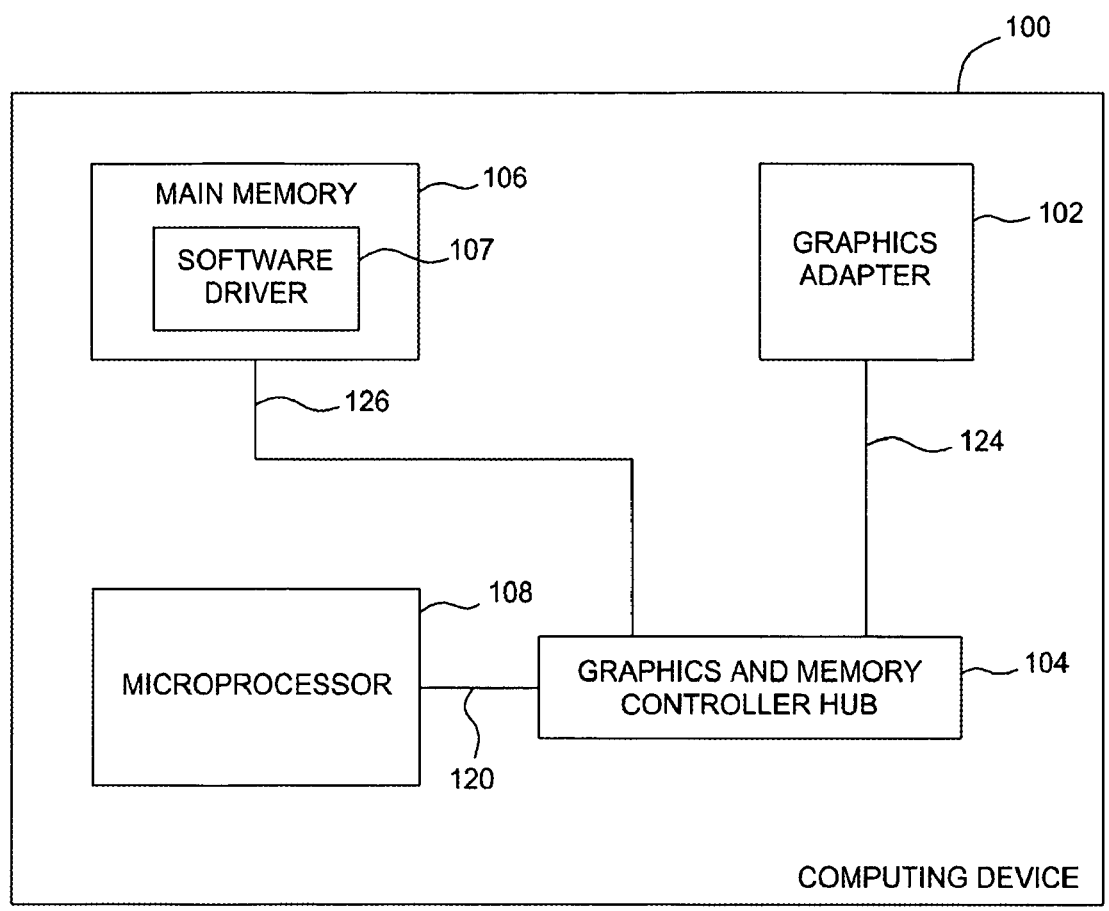
FIG. 1 is a block diagram illustrating a computing device in which one or more aspects of the invention may be implemented.

FIG. 1 illustrates a computing device 100 in which one or more aspects of the invention may be implemented. As shown, the computing device 100 includes a microprocessor 108, a main memory 106, a graphics adapter 102, and a graphics and memory controller hub 104. The main memory 106 includes a software driver program 107. The graphics and memory controller hub 104 is coupled to the microprocessor 108 (serving as the CPU), the main memory 106 and the graphics adapter 102 through hardware interfaces 120, 126 and 124, respectively. The computing device 100 may be a desktop computer, server, laptop computer, palm-sized computer, personal digital assistant, tablet computer, game console, cellular telephone, or any other type of similar device that processes information.

Figure 2:
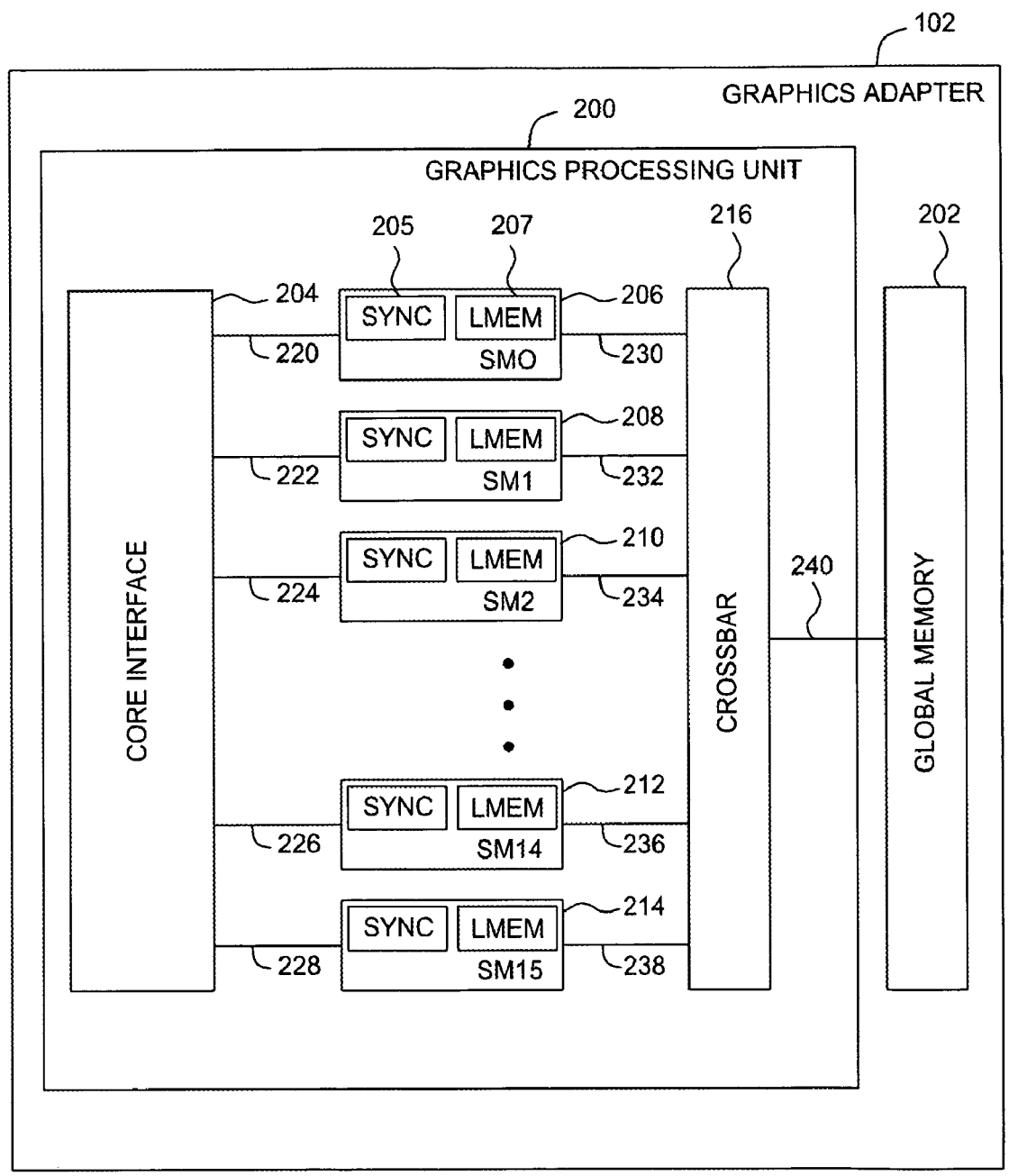
FIG. 2 is a block diagram illustrating the graphics adapter of FIG. 1, according to one embodiment of the invention.

FIG. 2 illustrates the graphics adapter 102 of FIG. 1, according to one embodiment of the invention. As shown, the graphics adapter 102 includes a graphics processing unit ("GPU") 200 and a global memory ("GMEM") 202. The GPU 200 includes a plurality of streaming multiprocessors, shown as "SM0" 206, "SM1" 208, "SM2" 210, "SM14" 212 and "SM15" 214. Each streaming multiprocessor is a single-instruction, multiple-data ("SIMD") multiprocessor that may execute instructions independently of the other streaming multiprocessors within the GPU 200. Each instruction executed by a streaming multiprocessor may perform arithmetic, logical and/or memory operations, including read and write operations to the GMEM 202. In an exemplary embodiment, the GPU 200 includes sixteen streaming multiprocessors, but only five have been illustrated for the sake of clarity. In other embodiments, different numbers of streaming multiprocessors may be included within the GPU 200.

As is well known, a SIMD streaming multiprocessor executes a single instruction on different data across a plurality of streaming processors included in the streaming multiprocessor. Thus, for example, the streaming multiprocessor 206 is configured to execute a series of common instructions on the streaming processors (not shown) within the streaming multiprocessor 206. The series of instructions sent to a single streaming processor is referred to herein as a "thread," and the collection of concurrently executing threads among the streaming processors within a streaming multiprocessor is referred to herein as a "thread group." In one embodiment with sixteen streaming processors per streaming multiprocessor, each thread group may include sixteen or more concurrently executing threads. The GPU 200 also includes a core interface 204 that couples the GPU 200 to the graphics and memory controller hub 104 of FIG. 1, through the interface 124. The core interface 204 is also coupled to the streaming multiprocessors 206, 208, 210, 212, and 214 through a plurality of couplings, shown as interfaces 220, 222, 224, 226, and 228, respectively.

As also depicted in FIG. 2, the plurality of streaming processors within each streaming multiprocessor has two levels of memory available for reading and writing data. The first is a local memory ("LMEM") that may be included within each streaming multiprocessor, and the other is the GMEM 202. Each LMEM is a small (e.g., 8 KB), fast (e.g., single clock cycle access time) shared memory. For each streaming multiprocessor (e.g., SM0 206), its associated LMEM (e.g., LMEM 207) is advantageously partitioned into a number of memory banks equal to the number of threads in the thread group executing concurrently across the streaming processors of that streaming multiprocessor. Thus, each thread group has the ability to perform concurrent read or write operations across the different memory banks of the LMEM. In the exemplary embodiment where there are sixteen streaming processors within each streaming multiprocessor and sixteen concurrently executing threads in a thread group, the thread group may perform up to sixteen simultaneous read or write operations in a single clock cycle in the absence of bank conflicts, which result when different threads attempt to concurrently access different addresses within the same memory bank of the LMEM. Although a LMEM has less memory capacity than the GMEM 202, storing data that is repeatedly accessed in a LMEM rather than in the GMEM 202 is advantageous due to the higher memory bandwidth of the LMEM. Further, because the LMEMs are local to the streaming multiprocessors, repeatedly accessing source tile data from the LMEMs instead of the GMEM 202 may substantially reduce the latencies typically encountered in prior art architectures when accessing such data.

The streaming multiprocessors 206, 208, 210, 212 and 214 are coupled to the GMEM 202 through a crossbar 216, which is advantageously designed to allow any streaming multiprocessor to access any memory location in the GMEM 202. The streaming multiprocessors 206, 208, 210, 212, and 214 access the GMEM 202 through couplings 230, 232, 234, 236, and 238 to the crossbar 216, respectively, and through the coupling between the crossbar 216 and the GMEM 202, shown as interface 240. The couplings 230, 232, 234, 236, 238, and 240, allow wide data transfers (e.g., 256 bits or more) between the GMEM 202 and the streaming multiprocessors of the GPU 200. The crossbar 216 is designed to allow a plurality of simultaneous memory accesses on contiguous memory locations within the GMEM 202 to be performed as a single, wide-memory operation referred to herein as a "coalesced" operation.

Coalesced operations may allow the streaming processors to fully exploit the wide interfaces between the GMEM 202 and the streaming multiprocessors of the GPU 200. For example, a thread group consisting of sixteen threads may perform sixteen simultaneous read operations to sixteen contiguous memory addresses within the GMEM 202. These operations may be coalesced such that the sixteen parallel read operations are effectively performed as a single read operation. The ability to coalesce memory operations between the streaming multiprocessors of the GPU 200 and the GMEM 202 is important because, among other things, the GMEM 202, while large (e.g., 256 MB), may exhibit higher latency and thus lower memory performance for single address memory operations than other types of memory, such as local memory. Thus, coalescing provides a way to reduce the overall cost of accessing the GMEM 202 by exploiting the wide interface of the GMEM 202 to perform a plurality of parallel memory operations. In other embodiments, any architecture that enables functionality similar to that provided by the crossbar 216 may be implemented. Although the graphics adapter 102 may contain additional elements, such as circuitry to generate an analog or digital video signal for display on a video display device, such additional elements were omitted for the sake of clarity.

Figure 3:
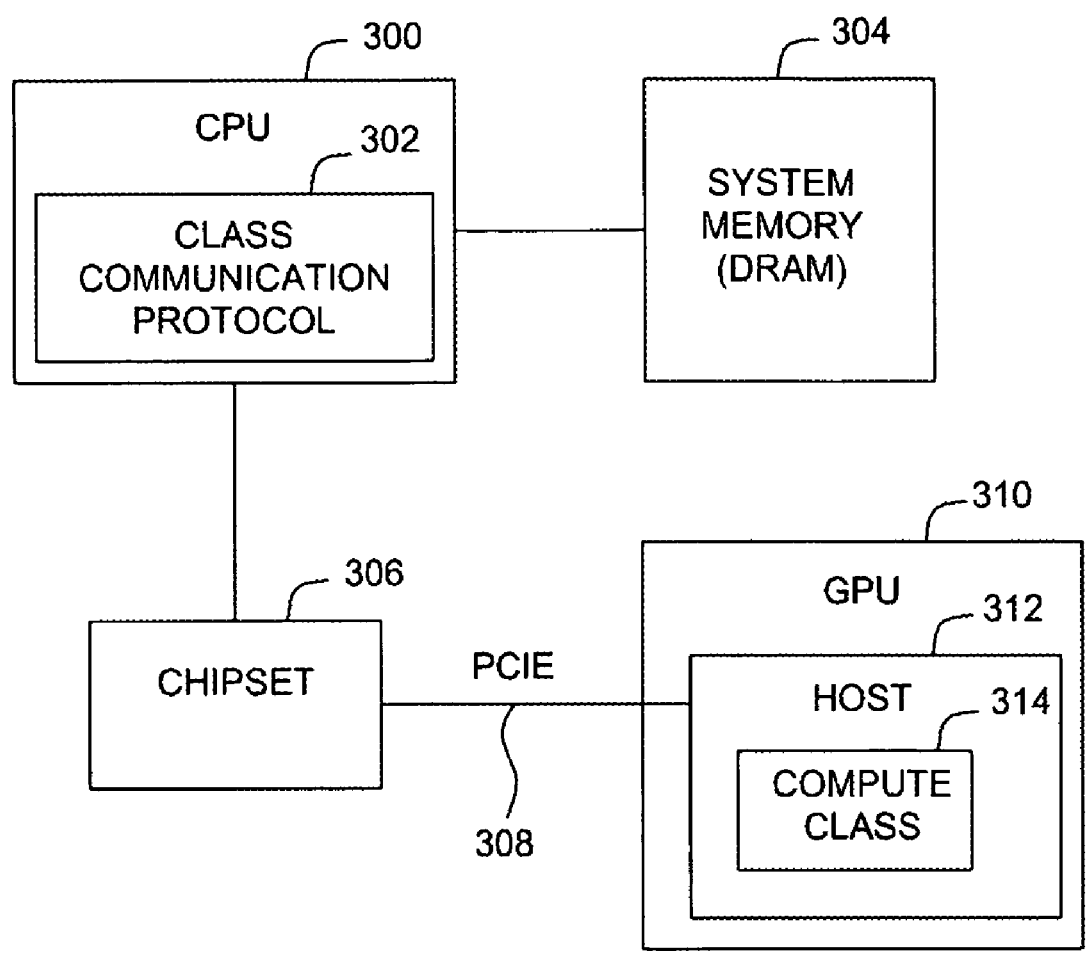
FIG. 3 is a block diagram illustrating another view of the operating environment on the computing device of FIG. 1.

FIG. 3 illustrates another view of the operating environment on the computing device of FIG. 1. In this exemplary embodiment, a command set for a GPU 310 is divided into one or more classes, which may have different instruction formats. One of the classes is a compute class 314. The compute class instructions provide support for integers (e.g., 32-bit integers), integer arithmetic, logical operations (e.g., AND, OR, XOR, NOT), shift, load, store, and other operations. Microcode resides in memory 304 to implement the compute class programs and other GPU commands in the GPU instruction set. When the CPU 300 has commands for the GPU 310 to execute, a driver (not shown) transmits those commands from the CPU to the GPU. The driver may be implemented in various ways. For example, the driver may comprise two different drivers, one that runs on the CPU and another that runs on the GPU. The driver downloads microcode to the GPU 310 for commands sent from the CPU using a class communication protocol 302 via a chipset 306 and a peripheral component interconnect express (PCIE) bus 308, as shown in this exemplary embodiment. The driver may also download microcode for arbitrarily long programs in terms of the number of cycles and the number of commands. The GPU 310 includes silicon (e.g., logic gates) that is configured to execute the microcode, including the compute class 314. This compute class infrastructure, including the ability to process integer and logical operations on the GPU 310, provides the functionality for the cryptographic computations described in greater detail herein. In another embodiment set forth in greater detail below, the driver enables cryptographic computations on the GPU 310, such as encrypting a payload using AES for use with IPsec. In one embodiment, the driver organizes encryption jobs for the GPU into batches of packets to minimize overhead and maximize efficiency. The overhead is minimized by spreading work over larger payloads and more threads.

Figure 4:
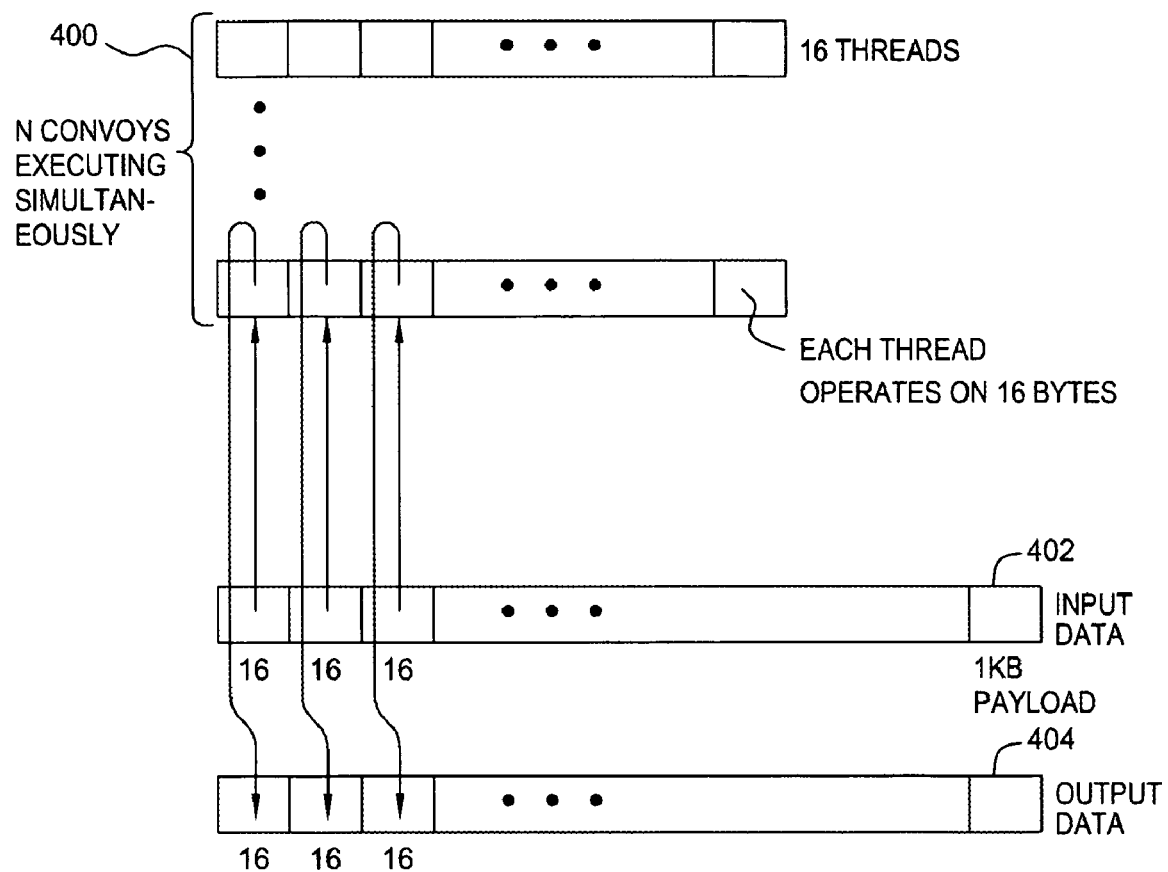
FIG. 4 conceptually illustrates how multiple threads may be used to encrypt data, according to one embodiment of the invention.

FIG. 4 conceptually illustrates how multiple threads may be used to encrypt data, according to one embodiment of the invention. As shown, a number of convoys 400 (i.e., thread groups), each with 16 threads, execute simultaneously in SIMD fashion so that each thread operates on 16 bytes of input data 402 to produce encrypted output data 404 (e.g., an AES encrypted payload). A payload in a packet may be in the range of about 84B to 9 kB. The driver may optimize the efficient use of the GPU 310 by considering packet size and processor overhead to determine batch size. In this example, 1 kB of input payload may be encrypted using 64 threads (i.e., 1024/16=64) running simultaneously on one of the streaming multiprocessors of the GPU 310. Further, each thread runs 10 rounds for the AES-128 algorithm. In one embodiment, the batch size is [N*16B]*k, where N is the number of threads needed to use the GPU resources efficiently, and k is the amount of GPU processing needed to make the CPU overhead use efficient. Thus, the driver divides encryption jobs into batches of packets to minimize overhead and maximize efficiency by considering several factors, such as the CPU speed, the number of streaming multiprocessors in the GPU, and the number of threads executing per streaming multiprocessor. In the AES algorithm, an input state matrix is a 4×4 matrix having 16 elements; these 16 elements are sequentially processed by 1 thread. Note that the 4×4 matrix is 16 bytes, which is processed by one thread, so that 16 threads may process 16 encryptions, each thread encrypting 16 bytes for a total of 256 bytes.

Figure 5:
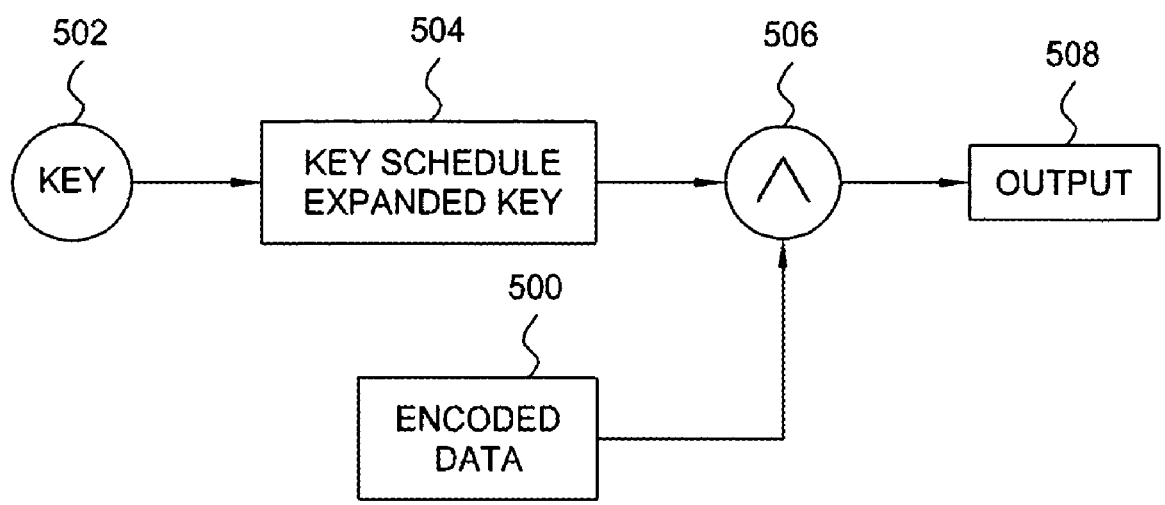
FIG. 5 is a block diagram illustrating a brief overview of the AES algorithm.

FIG. 5 illustrates a brief overview of the AES algorithm, which is intended for operation on a CPU and is not structured efficiently for operation on a GPU. A round of the AES algorithm is parameterized using a key schedule 504 that consists of a one-dimensional array of four-byte words derived from the key 502. A state array (encoded data 500) is processed by the following transformations during a round: SubBytes( ) ShiftRows( ) MixColumns( ) and AddRoundKey( ) as shown in Table 1 below. The state array 500 is a two-dimensional array of bytes. Each of the four rows of bytes in the state array 500 contains Nb bytes, where Nb is the block length in bits divided by 32. The SubBytes( )transformation is a non-linear byte substitution that operates independently on each byte of the state using a substitution table (S-box). In the ShiftRows( )transformation, the bytes in the last three rows of the state are cyclically shifted over different numbers of bytes (offsets). The MixColumns( )transformation operates on the state column-by-column, treating each column as a four-term polynomial. In the AddRoundKey( )transformation, a round key is added to the state by a simple bitwise XOR operation. Each Round Key consists of words from the key schedule. The output 508 is the transformed state at the end of all ten rounds of the algorithm for AES-128.

TABLE 1

Pseudo Code for the Cipher.

```
Cipher(byte in[4*Nb], byte out[4*Nb], word w[Nb*(Nr+1)])
begin
    byte state[4,Nb]
    state = in
    AddRoundKey(state, w[0, Nb-1])
    for round = 1 step 1 to Nr-1
        SubBytes(state)
        ShiftRows(state)
        MixColumns(state)
        AddRoundKey(state, w[round*Nb, (round+1)*Nb-1])
    end for
    SubBytes(state)
    ShiftRows(state)
    AddRoundKey(state, w[Nr*Nb, (Nr+1)*Nb-1])
    out = state
end
```

Figure 6:
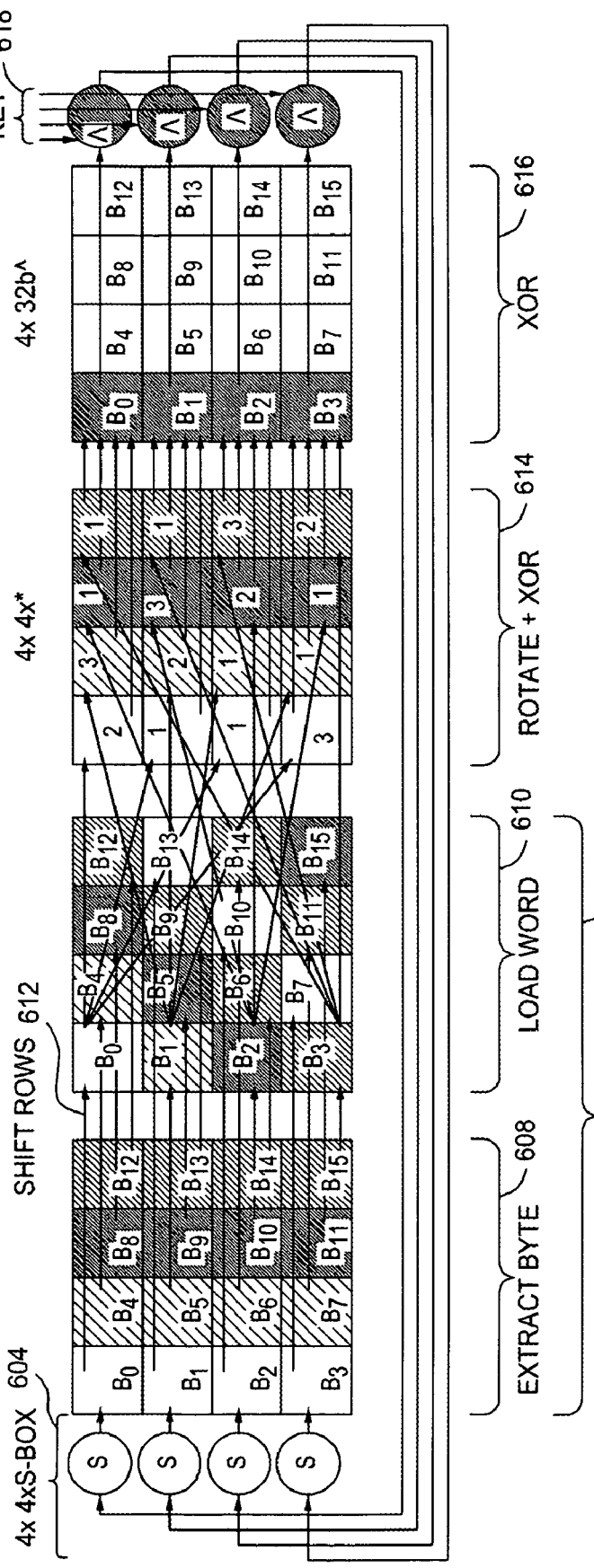
FIG. 6 is a block diagram illustrating an exemplary method of performing an AES 128b encryption round, according to one embodiment of the invention.
Figure 7:
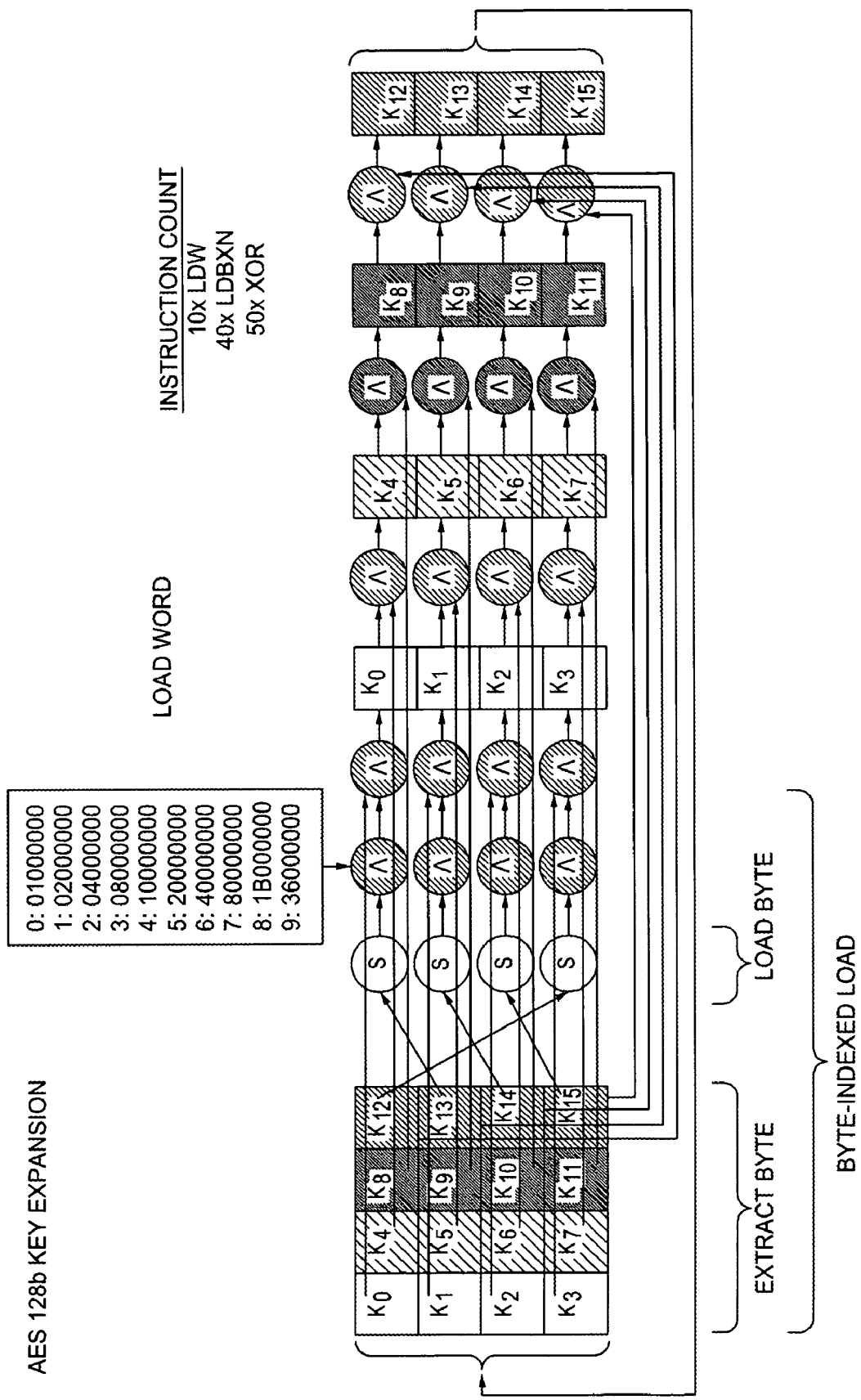
FIG. 7 is a block diagram illustrating an exemplary method of performing an AES 128b key expansion, according to one embodiment of the invention.

The remaining figures, FIGS. 6-11, relate to an exemplary method of performing AES encryption. FIGS. 6 and 7 illustrate a round of the AES algorithm and key expansion, respectively. FIGS. 8-11 explain certain aspects of the method in greater detail, e.g., the S-Box, GF multiplication, and rotation optimization using the lookup table of FIG. 11.

FIG. 6 illustrates an exemplary method of performing an AES 128b encryption round, according to one embodiment of the invention. In this exemplary embodiment, the throughput for performing cryptographic computations for AES in a non-feedback mode on a GPU, such as GPU 310 of FIG. 3 may be computed as follows. The AES algorithm can be decomposed to operate 32 bits at a time on one row of a key matrix. The first step, step 604, is a 16×1-byte table lookup operation implementing the S-Box function 604. Then, in step 612, the row part is shifted. Row shifting can be collapsed with the S-Box lookup operation by doing the S-Box lookup in post-shift order as shown in steps 606, 608, and 610. Words are read from the start address and the result of any operation is written to the rotated target address, where the relationship between these addresses reflects any shifts or rotations being performed at the same time as the operation. Mixing columns and performing Galois field (GF) multiplication are then done in steps 614 and 616. The constant matrix to be multiplied has four GF constants (from the standard) and the columns are just rotated (i.e., to effect a column rotation at the same time as the multiplication operation). Thus, the S-Box lookup can be collapsed with the GF multiplication so that four different S-Box tables pre-multiplied with the constants are pre-computed and stored in RAM 602. Furthermore, all four shifted values may be pre-multiplied, requiring 4 bytes per column*4 rotations*256*1 byte(S-Box)=4 kB of memory, instead of the 256 bytes required without these optimizations. Then, for one encryption round, 16 load byte instructions are needed for loading the bytes for the S-Box lookup, 16 load word instructions for performing the S-Box translation, 16-XOR instructions for mixing columns, and 4 XOR instructions for XORing the expanded key.

FIG. 7 illustrates an exemplary method of performing an AES 128b key expansion, according to one embodiment of the invention. Key expansion requires 4 load byte instructions for retrieving the column bytes, followed by 4 load byte instructions for retrieving the S-Box, followed by 5 XOR instructions and one load word instruction for XORing with the constant. The number of cycles needed for 10 rounds of processing 16 bytes may be computed as follows. For the counter mode, there are an additional 4 load, 4 store, 16 load word, and 16 XOR instructions and approximately 18 instructions of overhead. Therefore, 10*(16 load byte+16 load word+16 XOR+4 load byte+4 load byte+1 load word+5 XOR)=660 instructions. Note that 200 S-Box loads in the 16 thread SIMD case will likely cause a memory bank conflict, with an average of 4 clocks wasted per load, adding an additional 40 clocks. Thus, 730 clocks=(660+40+12+18) are needed to process 16 bytes of data and the throughput of a given streaming multiprocessor is 16 bytes*SIMD16*1.5 GHz/730 clocks=526 MB/s. Note that bidirectional line rate IPsec requires at most 250 MB/s, so even 1 SIM can achieve the line rate. Thus, even a low end integrated GPU of the type depicted in FIG. 2 may perform AES computations, reducing the CPU utilization from 100% for the full line rate to an estimated 10% for performing AES processing per frame. In addition, note that any feedback mode would have $\frac{1}{256}$ of 526 MB/s throughput and would require many concurrently encrypted/decrypted frames in parallel, which is not a realistic scenario. Therefore, one embodiment uses the GPU only for non-feedback mode AES for IPsec.

Figure 8:
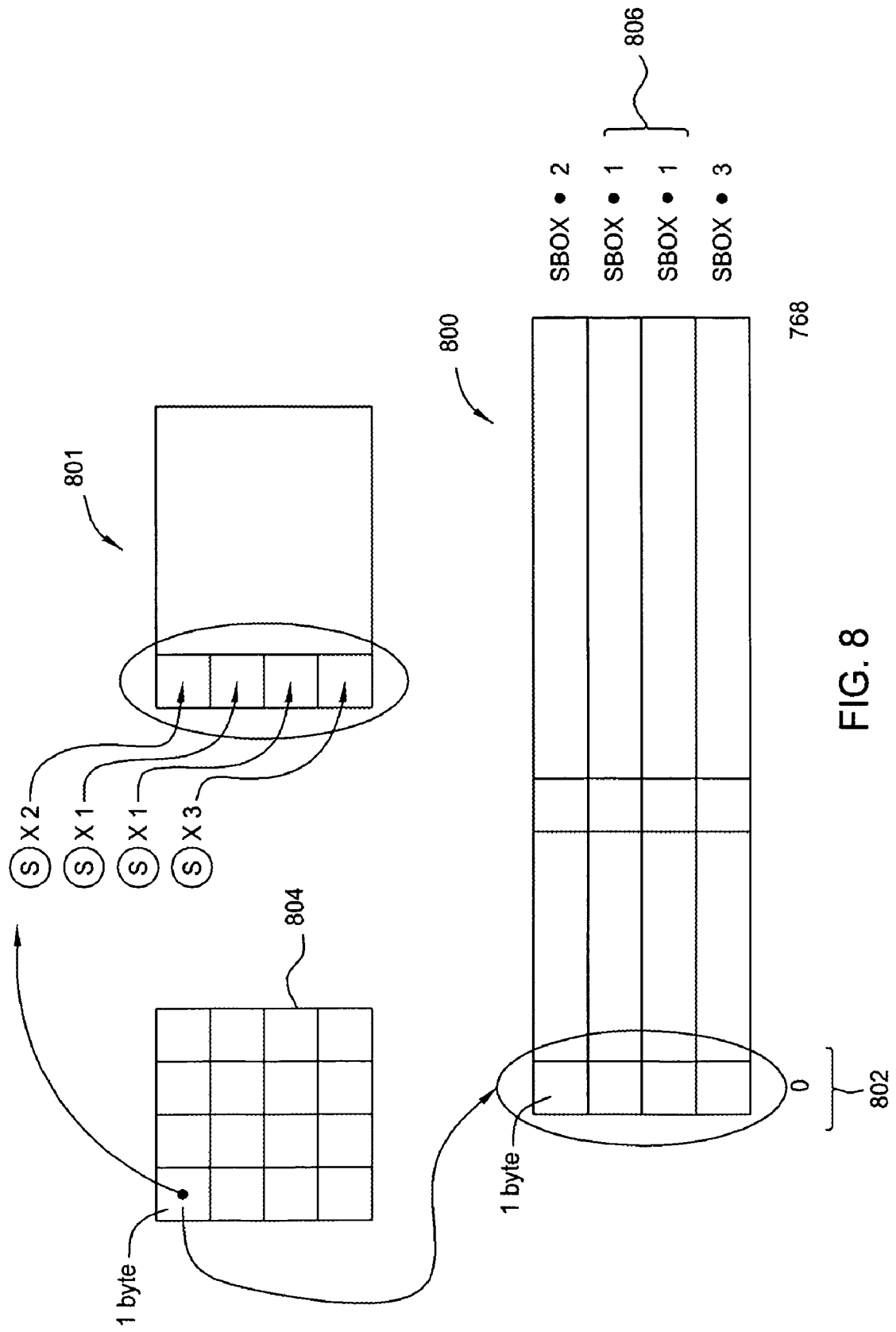
FIG. 8 is a block diagram illustrating an exemplary method of GF multiplication, according to one embodiment of the invention.

FIG. 8 illustrates an exemplary method of GF multiplication, according to one embodiment of the invention. Rather than perform GF multiplication for each S-box lookup 801, in this exemplary embodiment, a table 800 is precomputed containing the S-box multiplied by each of the three GF constants (e.g., 2, 1, 1, and 3, where 1 is repeated at 806) for each column 802 of the state 804. The resulting table 800 is 256*3=768 bytes. By precomputing this table 800, there is no overhead for the GF multiplication and the difficulties associated with reproducing the GF multiplication instructions on the GPU side are avoided.

Figure 9:
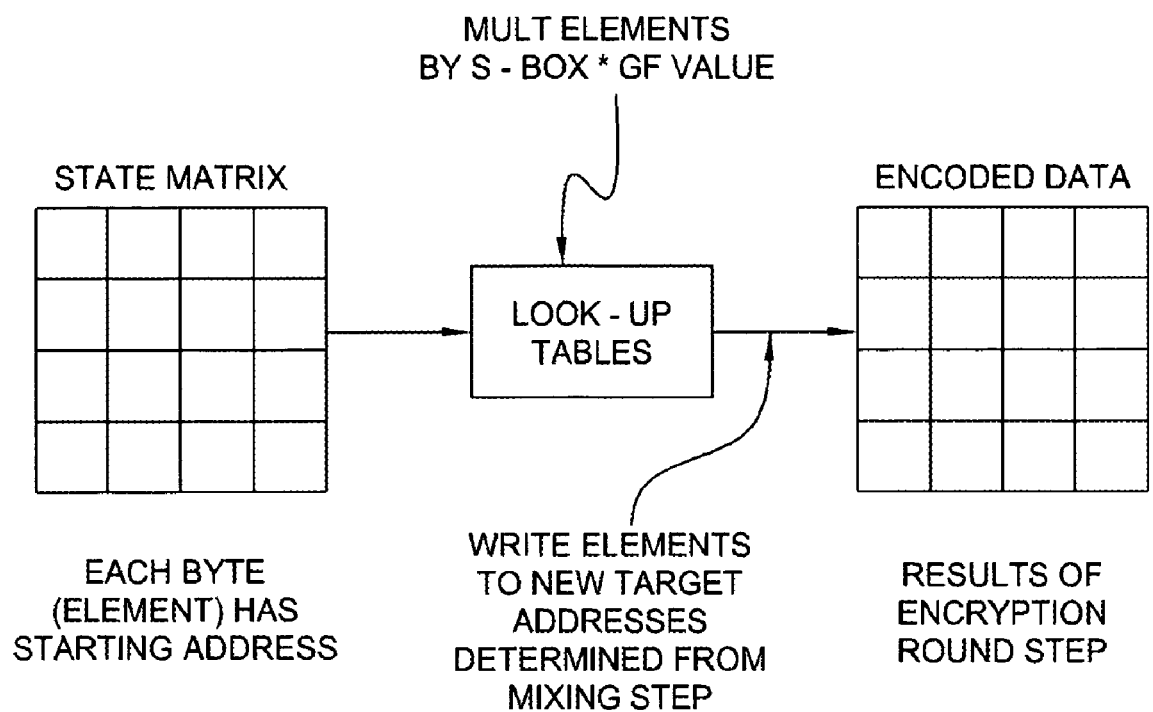
FIG. 9 is a block diagram illustrating an exemplary method of performing S-box lookup, GF multiplication, and rotation all at the same time, according to one embodiment of the invention.

FIG. 9 illustrates an exemplary method of performing S-box lookup, GF multiplication, and rotation all at the same time, according to one embodiment of the invention. In this exemplary embodiment, the S-box lookup is performed in conjunction with the row and column mixing (rotation), the GF multiplication by using the table of FIG. 8, and the result is written to the precomputed (rotated) target address, further eliminating processing time and avoiding the processing overhead normally associated with the rotation steps.

Figure 10:
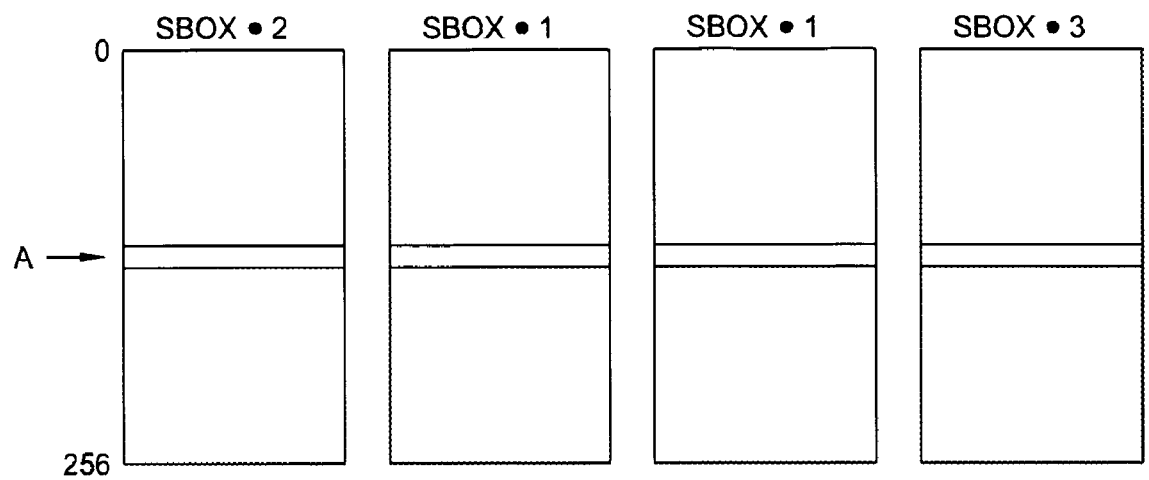
FIG. 10 is a block diagram illustrating an exemplary per-state element set of lookup tables, according to one embodiment of the invention.

FIG. 10 illustrates an exemplary per-state element set of lookup tables, according to one embodiment of the invention. A state element has 256 possible values, because it is one-byte in length (i.e., $2^8$=256). For each state element value, A, the results of the S-box lookup and GF multiplication are precomputed. Each value in these four lookup tables is one-byte. Therefore, each table is 256 bytes.

FIG. 11 illustrates a further optimization of the lookup tables, according to one embodiment of the invention. The four lookup tables are combined into one one-kB table (4*256=1024) to reduce the number of lookups. The S-box lookup of one-byte followed by GF multiplication by four different constants results in 4 bytes. There is a one-byte index, but the table contains 4 bytes. Instead of looking up each of 4 bytes 1100, 1102, 1104, 1106, this exemplary embodiment looks up a 32-bit word 1108. Four one-byte lookups are thus replaced by one four-byte lookup, thereby resulting in a four-fold increase in processing speed.

One advantage of the disclosed method and system is that it offloads cryptographic computations from the CPU. As a result, cryptographic computations are performed faster and more efficiently on the GPU, freeing resources on the CPU for other tasks.

While the foregoing is directed to embodiments of the present invention, other and further embodiments of the invention may be devised without departing from the basic scope thereof, and the scope thereof is determined by the claims that follow. Exemplary implementations of the AES algorithm for a cipher key with a length of 128 bits have been described. However, one of skill in the art will be able to implement the methods for cipher keys with lengths of 192 or 256 bits or make other modifications (e.g., to comply with future standards or versions of the standard) using the general concepts described herein. For example, cryptographic computations for kinds of encryption other than AES may be performed by using the general concepts described herein with variations according to the kind of encryption, as known to one of skill in the art. Although methods of encryption are described herein, methods of decryption follow in a straightforward manner from the general concepts described herein, as known to one of skill in the art. The present invention is not limited to any particular operating environment and the methods may be varied for implementation on other GPUs in other computing devices, past and present, as known to one of skill in the art. For example, integers and integer operations (e.g., XOR, AND) may be emulated with floating point numbers and floating point operations.

What is claimed is:

1. A computing system for performing a cryptographic computation, the computing system comprising:
   a system memory configured to store microcode corresponding to the cryptographic computation;
   a central processing unit (CPU) coupled to the system memory; and
   a graphics processing unit (GPU) including one or more streaming multiprocessors and configured to:
   receive commands associated with the cryptographic computation from the CPU, wherein the commands are included in a compute class that includes instructions that provide support for integer arithmetic,
   receive the microcode corresponding to the cryptographic computation from the system memory via the CPU, wherein the microcode is configured to implement the commands included in the compute class, and
   perform the cryptographic computation by executing the microcode, wherein the one or more streaming multiprocessors execute the microcode.

2. The computing system of claim 1, wherein the one or more streaming multiprocessors are further configured to perform a plurality of integer and logical operations when performing the cryptographic computation.

3. The computing system of claim 1, wherein a driver executing on the CPU is configured to transmit the commands to the GPU and is further configured to divide the commands into batches.

4. The computing system of claim 3, wherein a number of commands included in each batch is determined based on at least one factor selected from the following: a CPU speed, a number of the one or more streaming multiprocessors, and a number of threads executing per streaming multiprocessor.

5. The computing system of claim 1, wherein the cryptographic computation is for encrypting at least one payload of data using an advanced encryption standard (AES) algorithm.

6. The computing system of claim 5, wherein a plurality of thread groups execute on the GPU, each thread group comprises 16 threads and each thread is capable of encrypting one of sixteen elements of a 4×4 input state.

7. The computing system of claim 5, further comprising a pre-computed table stored in a memory, the pre-computed table replacing a plurality of S-box lookups, a plurality of GF multiplications, and a plurality of row and column mixing.

8. The computing system of claim 7, wherein for each of the 16 elements of a 4×4 input state, the results of the S-box lookups and GF multiplications are pre-computed.

9. The computing system of claim 7, further comprising a one-byte index to read a word from the pre-computed table, the word comprising pre-computed values for four state elements.

10. A method for performing a cryptographic computation, the method comprising:
    receiving commands associated with the cryptographic computation from a central processing unit (CPU), wherein the commands are included in a compute class that includes instructions that provide support for integer arithmetic;
    receiving microcode associated with the cryptographic computation from a system memory via the CPU, wherein the microcode is configured to implement the commands included in the compute class; and
    performing the cryptographic computation by executing the microcode on one or more streaming multiprocessors that are not included in the CPU.

11. The method of claim 10, wherein the step of performing the cryptographic computation includes performing a plurality of integer and logical operations.

12. The method of claim 10, further comprising the step of dividing the commands into batches.

13. The method of claim 12, wherein a number of commands included in each batch is determined based on at least one factor selected from the following: a CPU speed, a number of the one or more streaming multiprocessors, and a number of threads executing per streaming multiprocessor.

14. The method of claim 10, wherein the cryptographic computation is for encrypting at least one payload of data using an advanced encryption standard (AES) algorithm.

15. The method of claim 14, wherein a plurality of thread groups execute the microcode, each thread group comprises 16 threads and each thread is capable of encrypting one of sixteen elements of a 4×4 input state.

16. The method of claim 14, wherein a pre-computed table replaces a plurality of S-box lookups, a plurality of GF multiplications, and a plurality of row and column mixing.

17. The method of claim 16, wherein for each of the 16 elements of a 4×4 input state, the results of the S-box lookups and GF multiplications are pre-computed.

18. The method of claim 16, further comprising a one-byte index to read a word from the pre-computed table, the word comprising pre-computed values for four state elements.

* * * * *